United States Patent [19]

Unno et al.

[11] Patent Number: 4,692,760

[45] Date of Patent: Sep. 8, 1987

[54] DISPLAY APPARATUS

[75] Inventors: Shohei Unno, Numazu; Mikio Nakakawazi; Kazufumi Suzuki, both of Shizuoka, all of Japan

[73] Assignee: Tokyo Electric Co., Ltd., Tokyo, Japan

[21] Appl. No.: 752,456

[22] Filed: Jul. 5, 1985

[30] Foreign Application Priority Data

Jul. 24, 1984 [JP] Japan ................................. 59-153860

[51] Int. Cl.⁴ .......................... G09G 3/04; G09G 3/20
[52] U.S. Cl. ..................................... 340/756; 340/752; 340/790
[58] Field of Search ............... 340/716, 717, 718, 721, 340/756, 789, 794, 800, 811, 815.02, 815.04, 815.21, 752, 790, 799, 814; 350/374

[56] References Cited

U.S. PATENT DOCUMENTS

| 4,188,626 | 2/1980 | Frantz et al. | 340/756 X |
| 4,194,199 | 3/1980 | Shepherd et al. | 340/756 X |
| 4,206,459 | 6/1980 | Houryu et al. | 340/756 X |
| 4,270,846 | 6/1981 | Miyamoto | 350/374 |
| 4,465,999 | 8/1984 | Tsuzuki et al. | 340/756 |
| 4,504,829 | 3/1985 | Usui | 340/756 |

FOREIGN PATENT DOCUMENTS 2125588  3/1984  United Kingdom ................ 340/756

Primary Examiner—Gerald L. Brigance
Attorney, Agent, or Firm—Frishauf, Holtz, Goodman & Woodward

[57] ABSTRACT

The display apparatus includes a first display unit having dot display elements arranged in a matrix of m columns × n rows, a second display unit having n segment display elements arranged to have a predetermined pattern, and a display drive circuit to drive the first and second display units. This display drive circuit has a control circuit which generates display data to designate the character to be displayed in each display region in the first and second display units and which sequentially activates the display regions in the first and second display units, and a drive circuit which supplies m × n dot data corresponding to the display data from the control circuit to the dot display elements in each of the display regions of the first display unit and which also supplies predetermined n dot data among these m × n dot data to the segment display elements in each of the display regions in the second display unit.

5 Claims, 5 Drawing Figures

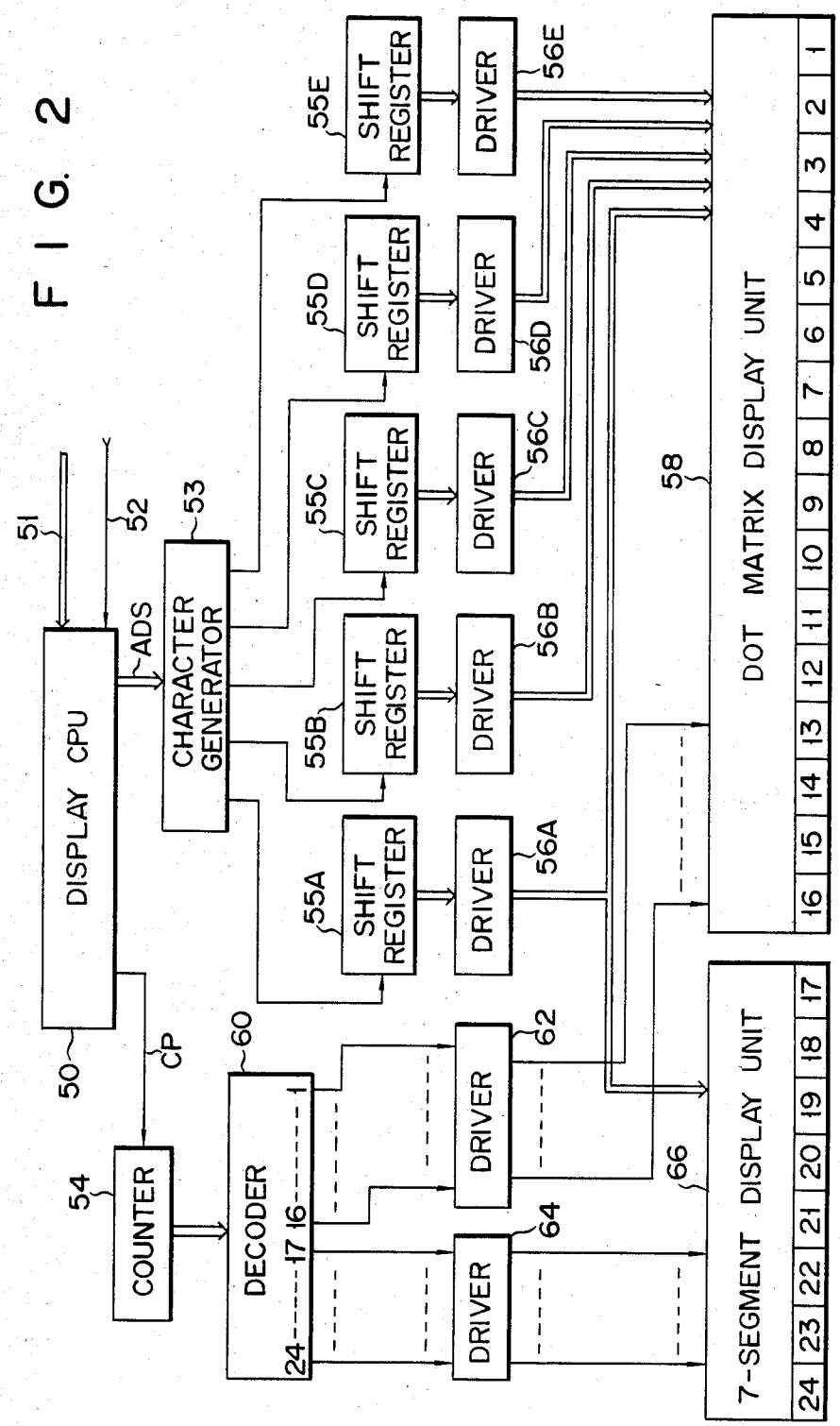
F I G. 2

FIG. 3
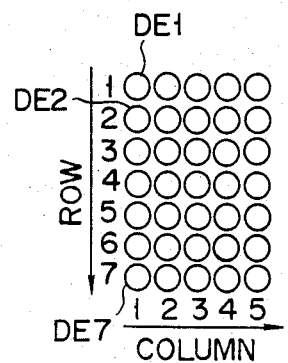
FIG. 4
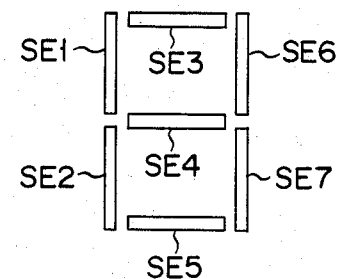
FIG. 5
| COLUMN / ROW | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0 | ◻ |   | 0 | ∂ | P | ` | p | Ä | 'u | ▨ | — | タ | ≋ | 日 |   |
| 1 | 1 | ⊏ | ! | 1 | A | Q | a | q | ö | β | ° | ア | チ | ム | ☰ |   |
| 2 | 2 | ⊐ | " | 2 | B | R | b | r | ü | æ | ⌐ | イ | ツ | メ |   |   |
| 3 | 3 | ⋃ | # | 3 | C | S | c | s | ä | œ | ⌙ | ウ | テ | モ | ◇ |   |
| 4 | 4 | P | $ | 4 | D | T | d | t | ö | Æ | , | エ | ト | ヤ |   |   |
| 5 | 5 | L | % | 5 | E | U | e | u | ü | Œ | + | オ | ナ | ユ | \ |   |
| 6 | 6 | - | & | 6 | F | V | f | v | ら | ¢ | ヲ | カ | ニ | ヨ |   |   |
| 7 | 7 | H | ' | 7 | G | W | g | w | é | £ | ァ | キ | ヌ | ラ |   |   |
| 8 | 8 | Γ | ( | 8 | H | X | h | x | è | Σ | ィ | ク | ネ | リ |   |   |
| 9 | 9 | ⅃ | ) | 9 | I | Y | i | y | â | ÷ | ゥ | ケ | ノ | ル |   |   |
| A | A | ⌐ | * | : | J | Z | j | z | ê | ⎯ | ェ | コ | ハ | レ |   |   |
| B | b | ⌐ | + | ; | K | [ | k | { | ñ | ⎯ | ォ | サ | ヒ | ロ |   |   |
| C | C | ⊢ | , | < | L | ¥ | ℓ | l | ñ | ↓ | ャ | シ | フ | ワ |   | ▲ |
| D | d | ⊣ | - | = | M | ] | m | } | 'a | ↑ | ュ | ス | ヘ | ン |   | ▼ |
| E | E | ⋮ | . | > | N | ^ | n | ~ | ò | ½ | ョ | セ | ホ |   |   |   |
| F | F |   | / | ? | O | _ | o | ⊠ | 'ε | ¼ | ッ | ソ | マ | ° | — |   |

DISPLAY APPARATUS

BACKGROUND OF THE INVENTION

The present invention relates to a display apparatus to control two character display units of a dot matrix type and a segment type.

For instance, there are display apparatuses such as an electronic cash register which are arranged in a store or the like in which a plurality of display sections including a display section for a cashier and a display section for a customer are provided for a single information processing apparatus. Further, among such information processing apparatuses having a plurality of display sections, there is also an apparatus in which the respective display sections are constituted by different kinds of display units such as a dot matrix display unit and a seven-segment display unit. In this case, for example, the seven-segment display section is used to display a sales amount and the dot matrix display section is used to display the sales amount and transaction information.

As mentioned above, in the display apparatus of the information processing apparatus using two kinds of display units such as the dot matrix display unit and 7-segment display unit, a control circuit for controlling the dot matrix display unit and a control circuit for controlling the 7-segment display unit are independently provided as shown in FIG. 1. Namely, this display apparatus includes a display CPU 10 and a display control unit 20 which are connected to a main central processing unit (CPU) serving as an exterior controller (not shown) through a data bus 2 and a control line 3. When the display CPU 10 receives a character code transmitted from the main CPU, the CPU 10 transmits an address signal to designate the address of a character generator 11 where the dot pattern corresponding to the input character code is stored. The character generator 11 stores the shape of each character to be displayed as a dot pattern in a dot matrix formed of, e.g., five columns × seven rows. The character generator 11 receives the address signal and then transmits the 7-bit dot data of the respective first to fifth columns constituting the dot matrix in the designated address to five shift registers 12-1 to 12-5, respectively. The shift registers 12-1 to 12-5 each supply the 7-bit dot data of a corresponding column of the selected dot pattern as a dot drive signal to dot electrodes of a corresponding column in each display digit constituting the dot matrix display unit 14 through a driver 13.

On the other hand, in order to dynamically or time-sharingly drive the respective display digits formed of a plurality of light emitting elements of the dot matrix display unit 14 the display CPU 10 supplies a count pulse to a counter 15 synchronously with the generation of the foregoing address signal to the character generator 11. The counter 15 counts the count pulse and then supplies count data, corresponding to the count thereof, to a decoder 16. The decoder 16 sequentially supplies a digit signal, indicative of the display drive digit corresponding to the count data, to a common electrode and the selected display digit of the dot matrix display unit 14 through a digit driver 17. In this way, the respective display digits of the dot matrix display unit 14 are dynamically driven.

In addition, the display control unit 20 also connected to the main CPU (not shown) through the data bus 2 and control line 3 supplies a segment signal corresponding to the character code supplied from the main CPU to each segment electrode of each display digit constituting the 7-segment display unit 22 through a segment driver 21. On one hand, in order to dynamically or time-sharingly drive the respective display digits formed of seven segment electrodes such as LEDs or the like of the 7-segment display unit 22, the display control unit 20 supplies a scan signal to a decoder 23 synchronously with the generation of the segment signal to the 7-segment display unit 22. Whenever the decoder 23 receives the scan signal, it sequentially supplies a digit signal representative of the display drive digit to a common electrode of a corresponding digit of the 7-segment display unit 22 through a digit driver 24. In this way, the respective digits of the 7-segment display unit 22 are dynamically driven.

However, such a display apparatus in which the control circuits for controlling the dot matrix display unit 14 and the 7-segment display unit 22 are independently provided as mentioned above has the following problems. Namely, since the display units 14 and 22 for displaying characters respectively have independent display control circuits, the number of circuit parts such as IC elements and the like increases, making the whole display apparatus bulky and increasing the manufacturing costs.

On the other hand, it is necessary to respectively and independently control the display units 14 and 22, so that the control program of the main CPU has to be also constituted to respectively and independently control the dot matrix display unit 14 and 7-segment display unit 22. Therefore, there is also a problem such that the control program becomes complicated.

SUMMARY OF THE INVENTION

It is an object of the present invention to provide a display apparatus which can control two display units of a dot matrix type and segment display type by the same program.

This object is accomplished by a display apparatus comprising a dot matrix display unit having a plurality of display regions each having M dot display elements which are arranged substantially in a matrix form; a segment display unit having a plurality of display regions each having N ($<$M) segment display elements which are arranged to have a predetermined pattern; a control unit for generating display data to be displayed in each of the display regions in those dot matrix and segment display units and also for sequentially and cyclically activating the display regions in the dot matrix and segment display units; and a dot data generating unit having M output terminals to generate M dot data therefrom, these M output terminals being connected to the M dot display elements in each of the display regions of the dot matrix display unit and predetermined N output terminals among the M output terminals being connected to the N segment display elements in each of the display regions of the segment display unit.

In this invention, the dot data corresponding to the display data from the same control unit is supplied to the dot matrix display unit and segment display unit, and also the display regions in these dot matrix and segment display units are sequentially activated. Therefore, the same program can be used to control the operations of the dot matrix display unit and segment display unit.

BRIEF DESCRIPTION OF THE DRAWINGS

FIG. 2 is a block diagram of a display apparatus according to one embodiment of the present invention having a control circuit to commonly control a dot matrix display unit and a 7-segment display unit;

FIGS. 3 and 4 show arrangements of dot electrodes and segment electrodes in respective display regions of the dot matrix display unit and the 7-segment display unit, respectively; and FIG. 5 shows character data which is expressed by a dot pattern stored in a character generator for use in the display apparatus shown in FIG. 2.

DETAILED DESCRIPTION OF THE PREFERRED EMBODIMENT

Figure 1:
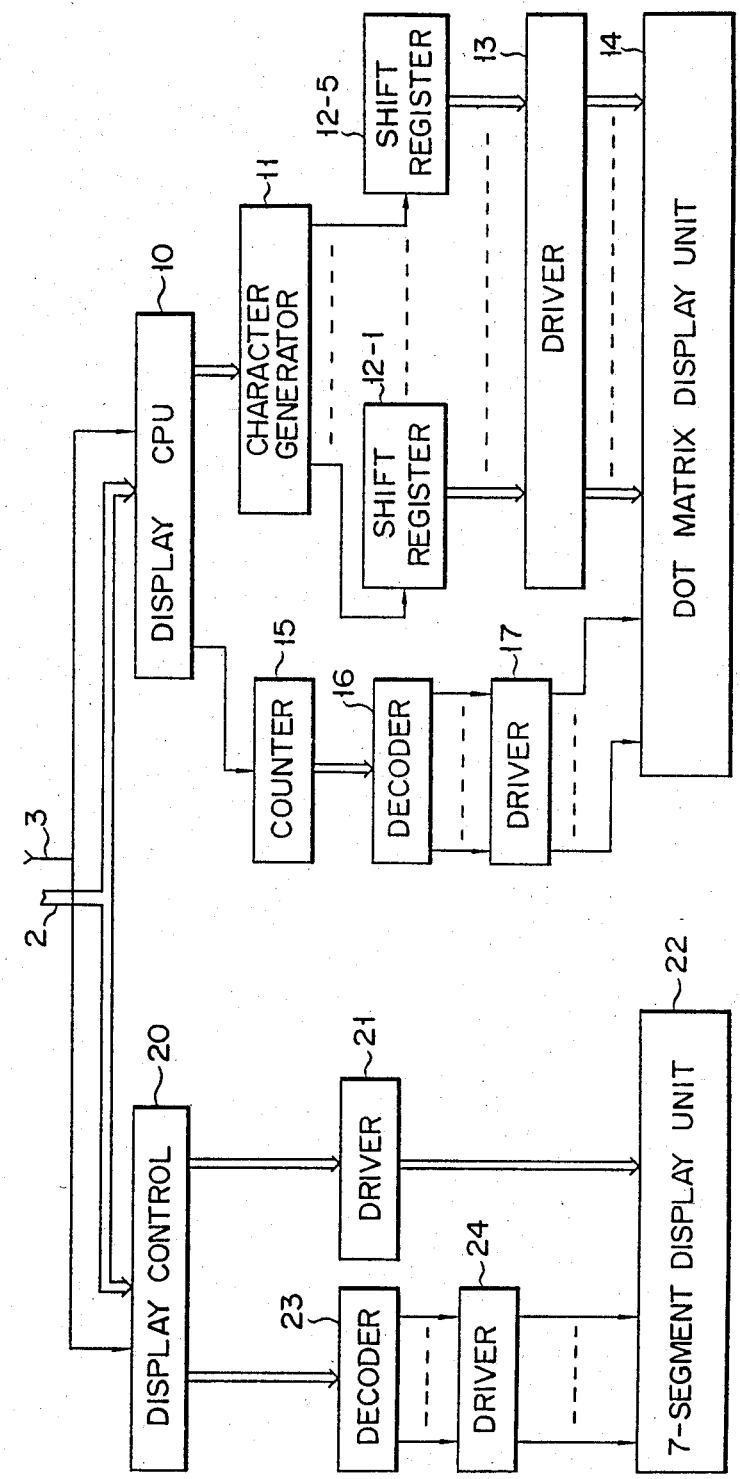
FIG. 1 is a block diagram of a conventional display apparatus having control circuits to individually control a dot matrix display unit and a 7-segment display unit.

One embodiment of the present invention will be described hereinbelow with reference to the drawings.

FIG. 2 is a block diagram showing a schematic arrangement of a display apparatus of the embodiment. This display apparatus has a display CPU 50 connected to a main CPU (not shown) serving as an exterior controller through a data bus 51 and a control line 52. The display CPU 50 transmits an address signal ADS to a character generator 53 on the basis of a character code transmitted from the main CPU and also sends a count pulse CP for dynamic display control to a 24-scale counter 54.

Shift registers 55A, 55B, 55C, 55D, and 55E which can respectively store 7-digit dot data are connected to five output terminals of the character generator 53. 7-bit dot drive signals which are generated from the respective shift registers 55A to 55E are supplied respectively through segment drivers 56A, 56B, 56C, 56D, and 56E to seven dot electrodes of the respective columns in each digit constituting the dot matrix display unit 58. The dot matrix display unit 58 has character display regions of, e.g., 16 digits. As shown in FIG. 3, thirty-five dot electrodes are arranged in a matrix of 5 columns×7 rows in each character display region. One common electrode is arranged to face those 35 dot electrodes in each character display region. Desired dots can be displayed by selectively applying a voltage between those dot electrodes and the common electrode. On one hand, the count data generated from the counter 54 is supplied to a decoder 60. The decoder 60 sequentially and cyclically energizes twenty-four output lines in accordance with the input count data. Output terminals "1" to "16" of the decoder 60 are connected through a digit driver 62 to the common electrodes in sixteen display regions of the dot matrix display unit 58, respectively. In addition, output terminals "17" to "24" of the decoder 60 are connected to the common electrodes in eight display regions of a 7-segment display unit 66 through a digit driver 64, respectively.

Seven bit signals in the 7-bit dot data of the segment driver 56A are supplied to seven dot electrodes DE1 to DE7 of the first column in each display digit of the dot matrix display unit 58, respectively, and these signals are also supplied to seven segment electrodes SE1 to SE7 in each display digit constituting the 7-segment display unit 66. The 7-segment display unit 66 has character display regions of, e.g., eight digits. As shown in FIG. 4, seven segment light emitting elements such as LEDs are arranged like the numeral "8" in each character display region. Namely, the seven segment electrodes SE1 to SE7 and a common electrode arranged to face these segment electrodes are arranged in each character display region. The foregoing segment light emitting elements are selectively activated by selectively applying a voltage between those seven segment electrodes and the common electrode. Thus, the characters of the first to sixteenth digits can be displayed by the dot matrix display unit 58, while the characters of the seventeenth to twenty-fourth digits can be displayed by the 7-segment display unit 66.

The shape of each character shown in FIG. 5 is stored as a dot pattern in the address corresponding to the character code in the character generator 53. For example, the dot pattern indicative of "1" which is designated by the character code [3,1] is stored in the address (3,1). The segment character indicative of "H" which is designated by the character code [1,7] is stored at the address (1,7). As shown in FIG. 5, the character codes having "0" or "1" at the first one of the two digits represent segment display characters, while the other character codes indicate dot display characters. The segment display character is recorded as 7-bit dot data representative of seven dot states constituting the first column of the dot pattern formed in a dot matrix of 5 columns×7 rows in the character generator 53. That is, each segment of the segment display character corresponds to each dot of the first column of the dot pattern. The dot data of each column other than the first column is always 0. Therefore, when the dot data of the first column is sent to the 7-segment display unit 66, the voltage is selectively applied between each segment electrode and the common electrode of the designated display digit, so that the segment character is displayed.

The display characters of the character codes of which the first digit is other than "0" or "1" are stored in the character generator 53 as dot patterns in an ordinary dot matrix of 5 columns×7 rows.

In the display apparatus constituted as described above, when the display CPU 50 receives the character code sent from the main CPU, it transmits the address signal ADS corresponding to the character code to the character generator 53. When the character generator 53 receives the address signal ADS, it transmits the dot data constituting the dot pattern in the designated address to the respective shift registers 55A, 55B, 55C, 55D, and 55E for every column. Therefore, the 7-bit dot data indicative of the states of seven dots in each column of the selected dot pattern is stored in each 7-digit memory area in each of the shift registers 55A to 55E. The seven bit signals of each dot data temporarily stored in the respective shift registers 55A to 55E are supplied as dot drive signals to the seven dot electrodes of the corresponding column in each of the matrix arranged dot patterns constituting the respective display digits of 1 to 16 of the dot matrix display unit 58 through respective segment drivers 56A to 56E.

The dot drive signals are generated from the segment driver 56A in accordance with the dot data of the first column of the dot matrix stored in the shift register 55A and then supplied to the seven dot electrodes in each of the display digits 1 to 16 of the dot matrix display unit 58 and to the seven segment electrodes in each of the display digits of 17 to 24 of the 7-segment display unit 66, respectively.

On the other hand, in order to dynamically or time-sharingly drive the respective display digits of 1 to 24 of the dot matrix display unit 58 and 7-segment display unit 66, the display CPU 50 generates the count pulse CP to the counter 54 synchronously with generation of the address signal ADS to the character generator 53. The counter 54 sequentially counts the count pulse CP and transmits the count data corresponding to the count thereof to the input terminal of the decoder 60. For instance, in this embodiment, the count data from the counter 54 is the 5-bit data within a range from "00000" to "10111". When the decoder 60 receives the count data of "00000" to "01111", it sequentially generates output signals at a "1" level from the output terminals "1" to "16". On one hand, when the decoder 60 receives the count data of "10000" to "10111", it sequentially generates output signals at a "1" level from the output terminals "17" to "24". In other words, if the most significant bit of the count data from the counter 54 is "0", one of the display digits of 1 to 16 of the dot matrix display unit 58 is selected. The voltage is selectively applied between each dot electrode constituting the matrix of the designated display digit and the common electrode in accordance with the 7-bit dot drive data generated from the respective shift registers 55A to 55E. Thus, the character corresponding to the character code supplied from the main CPU is dynamically displayed in the designated display digit.

On the contrary, when the most significant bit of the count data from the counter 54 is "1", one of the display digits of 17 to 24 of the 7-segment display unit 66 is selected. The voltage is selectively applied between each segment electrode constituting each segment character of the designated display digit and the common electrode in accordance with the 7-bit dot drive data generated from the shift register 55A. Thus, the character corresponding to the character code supplied from the main CPU is dynamically displayed in the designated display digit.

In such a display apparatus, if the display digit to display the character code supplied from the main CPU is included in the display digits of 1 to 16 which belong to the dot matrix display unit 58, the dot matrix data of one character generated from the character generator 53 is once divided into the dot data for every column and these divided dot data are stored into the shift registers 55A to 55E, respectively. Thereafter, they are displayed as dots in the designated display digit. When the display digit to display the character code supplied from the main CPU is included in the display digits of 17 to 24 which belong to the 7-segment display unit 66, the dot data of the first column of the dot matrix representing the seven segment data generated from the character generator 53 is supplied through the shift register 55A to the 7-segment display unit 66 and is displayed in the designated display digit.

Thus, there is no need to provide the respective independent control units to control the dot matrix display unit 58 and 7-segment display unit 66. Therefore, the number of circuit parts such as IC elements can be reduced and a small and cheap display apparatus can be manufactured as a whole.

In addition, since the respective display units 58 and 66 can be controlled by the same control program, the control program can also be simplified.

Although the present invention has been described in the above with respect to one embodiment, the invention is not limited to only this embodiment. For instance, in the foregoing embodiment, the seven bit signals are supplied from the seven output terminals of the 7-stage shift register 55A through the driver 56A to the seven segment electrodes of each display digit of the 7-segment display unit 66. However, seven bit signals from another one of the shift registers 55B to 55E may be supplied to the seven segment electrodes of each display digit of the 7-segment display unit 66 through the corresponding one of the drivers 56B to 56E. Further, the seven bit signals from preliminarily selected output terminals of the shift registers 55A to 55E may be supplied to seven segment electrodes of each display digit of the 7-segment display unit 66. For instance, the first and second output stages of the shift registers 55A and 55B and the first output stages of the shift registers 55C to 55E can be coupled to seven segment electrodes of each display digit of the display unit 66. In this case, it is apparently necessary to change the dot pattern indicative of the segment display character in the character generator 53 in accordance with the connection relation among the shift registers 55A to 55E and the 7-segment display unit 66.

Moreover, it is possible to variously change the number of display digits of the dot matrix display unit 58 and 7-segment display unit 66, the number of dots which are arranged in each display region in the display unit 58, the number of segments which are arranged in each display region of the display unit 66, and the character data which should be stored in the character generator 53 shown in FIG. 5.

What is claimed is:
1. A display apparatus comprising:
a dot matrix display unit having a plurality of display regions each having M dot display elements which are arranged substantially in a m×n=M matrix;
a segment display unit having a plurality of display regions each having N (<M) segment display elements which are arranged to have a predetermined pattern;
control means including means for generating display data to designate a character to be displayed in each of the display regions in said dot matrix display unit and segment display unit, and means for sequentially and cyclically activating the display regions in said dot matrix display unit and segment display unit; and
dot data generating means having M output terminals and including character generating means for generating M dot data at said M output terminals, said M dot data corresponding to the display data from said control means, and a driver circuit means for receiving the M dot data from said character generating means for supplying the received M dot data to the M dot display elements in each of the display regions in said dot matrix display unit, and also for supplying N dot data among said received M dot data to said N segment display elements in each of the display regions of said segment display unit, said driver circuit means comprising m register means each for temporarily storing n dot data among m×n dot data from said character generating means, and m drivers connected to respectively receive n dot data from said m register means and which each have output terminals connected to said n dot display elements on the corresponding one of the m columns in each of the display regions of said dot matrix display unit;

and means coupled to the control means for activating only one of the dot matrix display unit and the 7-segment display unit.

2. A display apparatus according to claim 1, wherein n is set to be equal to N and n output terminals of one of said m drivers are connected to N segment display elements in each of the display regions of said segment display unit.

3. A display apparatus according to claim 2, wherein said control means comprises first means for periodically generating a pulse and also generating said display data synchronously with said pulse; and said activating means comprises counting means for counting the pulse from said first means, and decoding means for activating a display region in one of said dot matrix display unit and segment display unit in accordance with the count data from said counting means.

4. A display apparatus according to claim 1, wherein said control means comprises first means for periodically generating a pulse and also generating said display data synchronously with said pulse; and said activating means comprises counting means for counting the pulse from said first means, and decoding means for activating a display region in one of said dot matrix display unit and segment display unit in accordance with the count data from said counting means.

5. A display apparatus comprising:
a dot matrix display unit having a plurality of display regions each having M dot display elements which are arranged substantially in a matrix form;
a segment display unit having a plurality of display regions each having N ($<M$) segment display elements which are arranged to have a predetermined pattern;
control means comprising a control unit for periodically generating a pulse and also generating display data synchronously with said pulse, said display data designating a character to be displayed in each of the display regions in said dot matrix display unit and segment display unit; and means for sequentially and cyclically activating one of the display regions in said dot matrix display unit and segment display unit in synchronism with the pulse from said control unit; and dot data generating means comprising character generating means for generating M dot data indicative of the character data corresponding to the display data from said control means; and a driver circuit which receives the M dot data from said character generating means and supplied the received M dot data to the M dot display elements in each of the display regions in said dot matrix display unit and also supplies N dot data among said received M dot data to said N segment display elements in each of the display regions of said display unit, wherein said dot display elements are arranged in a matrix of $m \times n$ ($=M$) in each of the display regions of said dot matrix display unit, and said driver circuits comprise m register means each for temporarily storing n dot data among m columns $\times$ n dot data from said character generating means; and m drivers which are connected to respectively receive n dot data from said m register means and which each have output terminals connected to said n dot display elements on the corresponding one of the m columns in each of the display regions of said dot matrix display unit.

* * * * *